March 6, 1956 D. P. TOURAND 2,737,355
EMERGENCY TRACTION DEVICE
Filed May 4, 1954 2 Sheets-Sheet 1
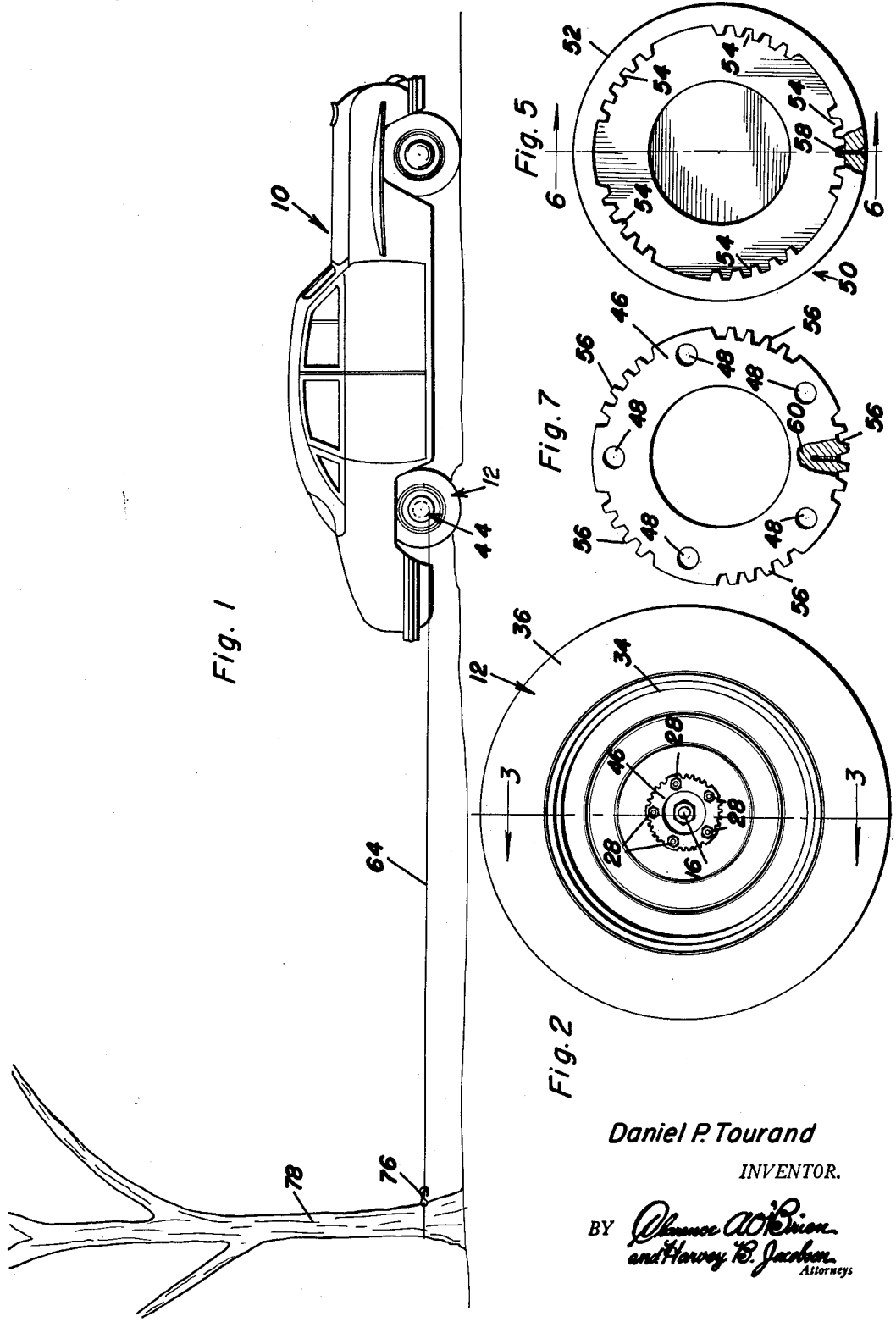
Daniel P. Tourand
INVENTOR.

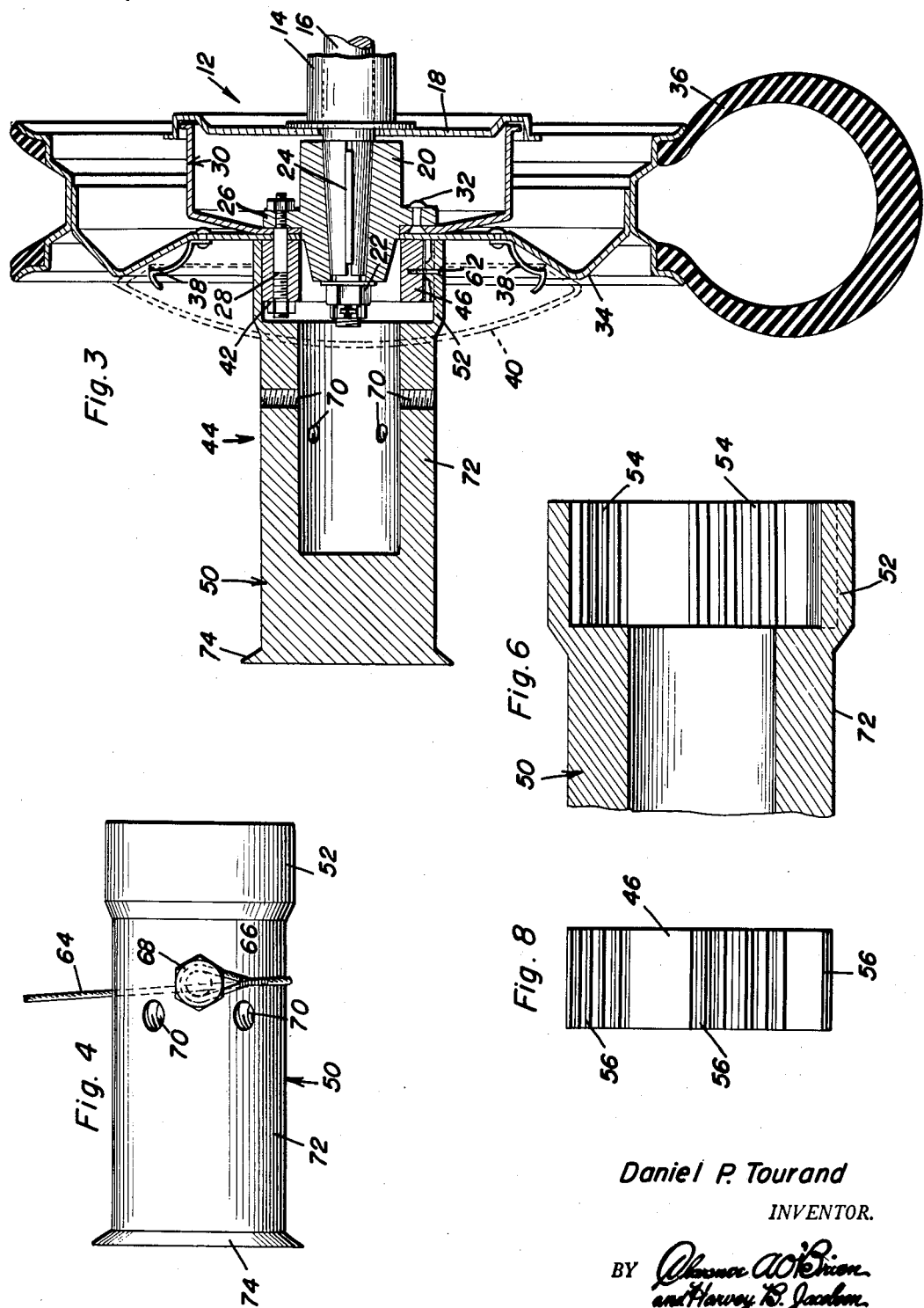

United States Patent Office 2,737,355
Patented Mar. 6, 1956

2,737,355

EMERGENCY TRACTION DEVICE

Daniel P. Tourand, Flushing, N. Y.

Application May 4, 1954, Serial No. 427,421

4 Claims. (Cl. 242—95)

This invention relates in general to improvements in winch construction, and more specifically to an emergency traction device for vehicles which may be secured to drive wheels of vehicles for facilitating their removal from mud, and the like, when stuck therein.

It has been recognized in the past that a vehicle becomes stuck in mud, snow, and the like, due to the fact that the drive wheels are unable to obtain sufficient traction to move the vehicle and that therefore they spin freely. In order to take advantage of the power of the drive wheels and the free spinning thereof, there has been devised numerous types of winches in the form of simple drums which may be secured to the drive wheels for rotation therewith and which have reeled thereon cables which may be attached to stationary objects such as trees. While such attachments have proved effective, they have not been widely used because the drum portion of such attachments must project outwardly of the wheel assemblies to which they are attached and this sort of construction is neither feasible nor would it be permitted. Therefore, it has been necessary to provide vehicle extricating attachments for vehicles which are removably secured to the wheel assemblies thereof. However, when one's vehicle is stuck, particularly in mud, it is highly undesirable to go out and loosen all of the lug bolts of a wheel so that the attachment may be secured thereto. Therefore, very few people have taken advantage of such a simple self-towing mechanism.

It is therefore the primary object of this invention to provide an improved attachment for drive wheel assemblies of vehicles in the form of an emergency traction device which may be connected to a stationary object, such as a tree, for extricating a stuck vehicle, the attachment including a drum on which a cable will be reeled, the drum being removably connectable to an adapter fitting carried by a drive wheel assembly in such a manner so that it may be quickly and easily connected to the adapter fitting with a minimum of effort and without releasing lug bolts of the wheel assembly.

Another object of this invention is to provide an improved drum for attachment to a drive wheel assembly of a vehicle to form a self-extricating attachment for such vehicle, the drum being so constructed whereby a cable may be quickly and easily attached thereto by one while in a standing position.

A further object of this invention is to provide an improved winch attachment for drive wheel assemblies of a vehicle, the winch attachment including an adapter fitting intended to be permanently secured to the drive wheel assembly and a drum removably carried by the adapter fitting and adapted to have a cable reeled thereon, the adapter fitting being of such a size whereby a hub cap of the drive wheel assembly may fit over the adapter fitting so as to completely hide it whereby the positioning of the adapter fitting on the wheel assembly does not in any way mar the appearance of the vehicle.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a stuck vehicle showing the same in the process of extricating itself through the use of the emergency traction device which is the subject of this invention;

Figure 2 is an enlarged elevational view of a rear drive wheel of the vehicle of Figure 1 and shows the same with a hub cap thereof removed in order to clearly illustrate the relationship of an adapter fitting secured to the wheel assembly by lug bolts thereof;

Figure 3 is an enlarged fragmentary vertical sectional view taken substantially upon the plane indicated by the section line 3—3 of Figure 2 and shows the relationship of the adapter fitting with respect to the wheel assembly, the adapter fitting being provided with a removable drum which forms another major portion of the present invention;

Figure 4 is an enlarged top plan view of the drum of Figure 3 and shows the manner in which a flexible tension member, such as a cable, is removably secured thereto;

Figure 5 (Sheet 1) is an enlarged end elevational view of the drum of Figure 4, as viewed from the right in Figure 4 and shows the arrangement of splines formed internally thereof, a portion of the drum being broken away in order to clearly illustrate the position of a bore therethrough for the reception of a fastener for retaining the drum on the adapter fitting;

Figure 6 is an enlarged fragmentary sectional view taken substantially upon the plane indicated by the section line 6—6 of Figure 5 and shows the general construction of one end of the drum;

Figure 7 is an enlarged end elevational view of the adapter fitting when removed from the wheel assembly, a portion of the adapter fitting being broken away and shown in section in order to clearly illustrate an internally threaded bore for the reception of a fastener securing the drum to the adapter fitting, the view being shown on sheet 1 of the drawings; and Figure 8 is an enlarged side elevational view of the adapter fitting.

Referring now to the drawings in detail, it will be seen that there is illustrated in Figure 1 a conventional vehicle which is referred to in general by the reference numeral 10. The vehicle 10 includes a pair of rear drive wheel assemblies 12.

As is best illustrated in Figure 3, each rear drive wheel assembly 12 includes a rear axle housing 14 which has extending therethrough a rear axle 16. Secured to the outer end of the rear axle housing 14 is a backing plate 18 on which brake shoes (not shown) are mounted. The rear axle 16 extends through the backing plate 18 and has removably mounted thereon a hub 20 which is secured in place by a rear axle nut 22. The hub 20 is keyed to the axle 16 by a key 24.

The hub 20 includes an annular flange 26 which carries a plurality of circumferentially spaced lug bolts 28. The lugs bolts 28 extend outwardly from the flange 26 and pass through a brake drum 30 which is secured to the annular flange 26 by circumferentially spaced rivets 32.

Removably secured to the hub 20 by the lug bolts 28 is a wheel 34 which is mounted in a tire 36. The wheel 34 is provided on the outer surface thereof with space clips 38 which are utilized to retain a hub cap 40 in place.

It is to be understood that the lug bolts for retaining the wheel 34 in place are normally short and that they have been replaced by elongated lug bolts 28. Further, while the lug bolts 28 have been illustrated as being of the stud type carrying removable nuts 42, in certain classes of vehicles they will be in the form of conventional bolts.

Secured to the rear drive wheel assembly 12 is the emergency traction device which is the subject of this invention, the emergency traction device being referred to in general by the reference numeral 44. The emergency traction device 44 includes a generally circular adapter fitting 46 which is annular in outline, as is best illustrated in Figure 7. The adapter fitting 46 is provided with a plurality of circumferentially spaced bores 48 through which the lug bolts 28 pass. It is to be understood that the adapter fitting 46 is permanently retained on the wheel assembly 12 and is of a size to fit within the confines of the hub cap 40, as is best illustrated in Figure 3. The emergency traction device 44 also includes a drum which is referred to in general by the reference numeral 50. The drum is relatively elongated and is provided at one end with an enlarged hub 52 which is best illustrated in Figure 6. The hub 52 is internally splined as at 54 and is so configurated whereby it will telescope over and interlock with the adapter fitting 46 which is externally splined as at 56.

The drum 50 may be removably attached to the adapter fitting 46 after the hub cap 40 has been removed by merely sliding it over the adapter fitting 46. In order that the drum 50 may be prevented from sliding off of the adapter fitting 46 while in use, the drum 50 is provided in the hub 52 thereof with a radially extending bore 58. The bore 58 is aligned with an internally threaded bore 60 in the adapter fitting 46, as is best illustrated in Figure 7. Passing through the bore 58 and threadedly engaged in the internally threaded bore 60 is a fastener 62, as is best illustrated in Figure 3.

The emergency traction device 44 also includes a flexible tension member in the form of a cable 64. The cable 64 is provided at one end with a loop 66 in which is removably received a bolt 68. The bolt 68 is removably received in one of a plurality of circumferentially spaced internally threaded bores 70 formed in the drum 50. The purpose of the plurality of internally threaded bores 70 is so that when it is desired to fasten the cable 64 to the drum 50, it is merely necessary to pass the end of the cable 64 provided with the loop 66 under the drum proper and then up over the drum 50, then pass the bolt 68 into the uppermost one of the bores 70.

As is best illustrated in Figures 3 and 4, the drum 50 has a central portion 72 which is of a reduced diameter as compared to the hub 52. The central portion 72 is intended to have reeled thereon a cable 64. In order to prevent the cable 64 from running off the end of the drum 50 remote from the hub 52, the end of the drum 50 remote from the hub 52 is in the form of an outwardly projecting annular flange 74.

Referring once again to Figure 1, it will be seen that the cable 64 is provided at the end thereof remote from the drum 50 with a hook 76. The end of the cable 64 provided with hook 76 is intended to be passed around a stationary object, such as a tree 78 and with the hook 76 engaging an intermediate portion of the cable 64. When the emergency tractor cable 44 is so arranged as illustrated in Figure 1, the drive mechanism of the vehicle 10 is laced in reverse with the result that when the drive wheel assembly 12 to which the emergency tractor cable 44 is attached tends to spin, the cable 64 will be reeled upon the drum 50 and the vehicle 10 pulled backwardly out of the mud or snow in which it is stuck.

It is the intention of this invention that the adapter fitting 46 be permanently secured to the wheel assembly 12. The drum 50 and the cable 64 may then be conveniently stored in the trunk of the vehicle 10 for future use. When it is found necessary to utilize the emergency traction device 44, it is merely necessary to remove the hub cap 40 and then slip the drum 50 in place over the adapter fitting 46. The cable 64 may either be initially connected to the drum 50 or connected thereto after it is secured to the adapter fitting 46.

It is realized that under certain circumstances, when the emergency traction device 44 is attached to one of the rear drive wheel assemblies 12, due to the force necessary to reel the cable 64 on the drum 50, the one wheel assembly 12 to which the traction device 44 is attached will not spin but that the other rear wheel assembly 12 will spin. Further, it is understood that in the event the emergency tractor cable 44 were then placed on the other of the wheel assemblies 12, the first wheel assembly would have a tendency to spin while the other wheel assembly stood still. In such cases where both rear wheel assemblies 12 have a tendency to spin, it may be necessary to provide both rear wheel assemblies 12 with emergency traction devices.

From the foregoing, it will be seen that there has been devised a semi-permanent attachment for a vehicle which may be utilized in connection with a vehicle in such a manner so that the vehicle may pull itself out when stuck and that the attachment is of such a nature so that all parts thereof may be quickly and easily connected to the vehicle in a minimum of time while at the same time the appearance of the vehicle is in no way marred.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination with a vehicle drive wheel assembly of the type including a drive axle, a brake drum secured to said axle for rotation therewith, a wheel, lug bolts mounting said wheel on said brake drum with said drive axle having an end projecting through said drum and said wheel, an emergency traction device, said emergency traction device comprising an adapter fitting secured to said wheel by said lug bolts, said adapter fitting being flat and disposed inwardly of said projecting axle end and having a central opening receiving said axle, a removable cable drum telescoped over said adapter fitting, means interlocking said adapter fitting and said cable drum for rotation in unison, said cable drum projecting exteriorly of said wheel assembly and having cable attaching means thereon.

2. In combination with a vehicle drive wheel assembly of the type including a drive axle, a brake drum secured to said axle for rotation therewith, a wheel, lug bolts mounting said wheel on said brake drum with said drive axle having an end projecting through said drum and said wheel, an emergency traction device, said emergency traction device comprising an adapter fitting secured to said wheel by said lug bolts, said adapter fitting being flat and disposed inwardly of said projecting axle end and having a central opening receiving said axle, a removable cable drum telescoped over said adapter fitting, means interlocking said adapter fitting and said cable drum for rotation in unison, said cable drum projecting exteriorly of said wheel assembly and having cable attaching means thereon, said means being in the form of a splined connection.

3. In combination with a vehicle drive wheel assembly of the type including a drive axle, a brake drum secured to said axle for rotation therewith, a wheel, lug bolts mounting said wheel on said brake drum, and a hub cap removably carried by said wheel concealing said lug bolts, an emergency traction device, said emergency traction device comprising an adapter fitting secured to said wheel by said lug bolts, said adapter fitting being flat and disposed within said hub cap, a removable cable drum telescoped over said adapter fitting with said hub cap removed, said cable drum being interlocked with said adapter fitting and projecting exteriorly of said wheel assembly, said cable drum having cable attaching means.

4. In combination with a vehicle drive wheel assembly of the type including a drive axle, a brake drum secured to said axle for rotation therewith, a wheel, lug bolts mounting said wheel on said brake drum, and a hub cap removably carried by said wheel concealing said lug bolts, an emergency traction device, said emergency traction device comprising an adapter fitting secured to said wheel by said lug bolts, said adapter fitting being flat and disposed within said hub cap, a removable cable drum telescoped over said adapter fitting with said hub cap removed, said cable drum being interlocked with said adapter fitting and projecting exteriorly of said wheel assembly, said cable drum having cable attaching means, and means releasably retaining said cable drum on said adapter fitting.

References Cited in the file of this patent

UNITED STATES PATENTS

| | | |
|---|---|---|
| 1,381,152 | Wilson | June 14, 1921 |
| 1,526,206 | Dominguez, Jr. | Feb. 10, 1925 |
| 1,837,583 | Powers | Dec. 22, 1931 |
| 2,584,099 | Harkrader | Jan. 29, 1952 |
| 2,662,731 | Smith | Dec. 15, 1953 |